US006931380B2

United States Patent
Shedd et al.

(10) Patent No.: US 6,931,380 B2
(45) Date of Patent: Aug. 16, 2005

(54) SYSTEM AND METHOD FOR DETECTING HIGH CREDIT RISK CUSTOMERS

(75) Inventors: Walter Shedd, Folsom, CA (US); Ling Ling Hsu, Yung-ho (TW)

(73) Assignee: Aurora Wireless Technologies, Ltd., Taipei (TW)

( * ) Notice: Subject to any disclaimer, the term of this patent is extended or adjusted under 35 U.S.C. 154(b) by 176 days.

(21) Appl. No.: 09/995,380

(22) Filed: Nov. 26, 2001

(65) Prior Publication Data

US 2002/0035543 A1 Mar. 21, 2002

Related U.S. Application Data

(62) Division of application No. 09/300,120, filed on Apr. 27, 1999.
(60) Provisional application No. 60/083,122, filed on Apr. 27, 1998.

(51) Int. Cl.[7] .............................................. G06F 17/60
(52) U.S. Cl. ........................ 705/52; 713/186; 713/184
(58) Field of Search ................................ 713/184, 186; 705/52, 77; 725/26, 25; 455/410, 406, 411, 408; 715/513

(56) References Cited

U.S. PATENT DOCUMENTS

| | | |
|---|---|---|
| 5,229,764 A | 7/1993 | Matchett et al. |
| 5,335,278 A | 8/1994 | Matchett et al. ............... 380/23 |
| 5,386,104 A | 1/1995 | Sime |
| 5,420,908 A | 5/1995 | Hodges et al. ................. 379/58 |
| 5,555,551 A | 9/1996 | Rudokas et al. ............... 379/59 |
| 5,602,906 A | 2/1997 | Phelps ......................... 379/114 |
| 5,627,886 A | 5/1997 | Bowman ..................... 379/111 |
| 5,802,198 A | 9/1998 | Beavers et al. ............. 382/115 |
| 5,872,834 A | 2/1999 | Teitelbaum ............... 379/93.03 |
| 5,907,803 A * | 5/1999 | Nguyen ....................... 455/410 |
| 5,937,162 A | 8/1999 | Funk et al. ............. 395/200.36 |
| 5,991,735 A | 11/1999 | Gerace ......................... 705/10 |
| 6,092,192 A | 7/2000 | Kanevsky et al. ........... 713/186 |
| 6,104,922 A | 8/2000 | Baumann ..................... 455/410 |
| 6,105,010 A | 8/2000 | Musgrave ..................... 705/44 |
| 6,154,727 A | 11/2000 | Karp et al. ..................... 705/3 |
| 6,195,568 B1 | 2/2001 | Irvin ........................... 455/563 |
| 6,269,348 B1 * | 7/2001 | Pare, Jr. et al. ............... 705/39 |
| 6,314,439 B1 * | 11/2001 | Bates et al. ................. 707/513 |

FOREIGN PATENT DOCUMENTS

JP 020001283223 A * 10/2001

* cited by examiner

Primary Examiner—Pierre E. Elisca
(74) Attorney, Agent, or Firm—Pillsbury Winthrop LLP

(57) ABSTRACT

A system detects subscription fraud in connection with any consumer related service which requires continuous access and payment over time. According to one aspect, a method performed by the system includes determining a subscription fraudster or someone whom has not fulfilled previous payment obligations for access to service, at or soon after the point of service application, by comparing at least one biometric value against those on file which are associated with past payment default. The method further includes utilizing non-threshold and non-market characteristic profile information which is not part of the data captured on the service order application for identifying an individual who has defrauded or defaulted on previous subscriptions for consumer services, viewing, storing, forwarding, and comparing biometric and non-application subscriber profile data which is not based on thresholds, transactions, nor market characteristics across many points of service activation, billing, and management, and combining and sharing biometric and user profile data across multiple service providers to restrict access to services at the time or shortly after application processing.

27 Claims, 13 Drawing Sheets

Biometric Sharing Model

Non-Application - Captured Subscriber Profile Data Sharing Model

Application Decision Logic Flow

Connectivity Architecture

SYSTEM AND METHOD FOR DETECTING HIGH CREDIT RISK CUSTOMERS

The present application is a divisional application of application Ser. No. 09/300,120, filed on Apr. 27, 1999, which is based on, and claims priority from, U.S. Provisional Patent Appln. No. 60/083,122, filed Apr. 27, 1998.

FIELD OF THE INVENTION

The present invention relates generally to credit approval systems, and more particularly to credit approval systems that provide for point-of-service risk determination.

BACKGROUND OF THE INVENTION

Recent technological advances in many fields, and particularly in wireless communications, have made an already difficult product/service provider ("service provider") determination even more difficult. That is, should the service provider extend credit to a potential or existing customer, or does extending the customer credit present the service provider with a heightened financial risk? Stated alternatively, a particular customer (i.e. including an applicant/potential customer or existing customer) might in fact be a credit risk. For example, certain customers might have or might develop a history of delinquency in paying their bills ("defaulters"). Other customers (referred to hereinafter as defrauders) might have or might develop a history of securing services without the intent to pay for those services. While determining whether or not to extend credit to a customer has long been problematic, technological advances are increasingly providing customers with greater opportunities for hiding and disguising prior or ongoing acts which identify them as credit risks. The advent of wireless communication technologies is further expanding such opportunities both domestically and internationally.

Methods used by defrauders to secure services, and particularly cellular telephone services, can be divided into the broad categories of technical fraud and subscription or subscriber fraud. Technical fraud, for example, broadly comprises securing unauthorized access to a service system by technological infiltration.

Unfortunately, while methods used by credit risks to commit technical fraud are often discoverable and defeatable to some extent, each new service provider precaution is typically met with a further method for defeating the precaution. For example, an early method used by credit risks to infiltrate analog wireless telephone systems is known as tumbling. Tumbling involves changing a mobile identification number ("MIN") or cellular phone number ("CPN") to correspond with the internally programmed electronic serial number of a cellular telephone, thereby providing access to a communications network. After discovering the use of tumbling, service providers added the precaution of requiring a received MIN-ESN combination to match a registered combination before granting access to a network. While tumbling essentially disappeared, defrauders soon began committing what is known as cloning fraud. With cloning fraud, a defrauder copies the MIN-ESN combination assigned to a bona fide subscriber and then uses the combination to gain network access. The combination is obtained either directly from service provider data (generally with the aid of an unscrupulous service provider employee) or by capturing the combination from the airwaves (for example, as a user drives by with an activated car telephone). While service providers are developing various precautions for defeating cloning fraud, new methods for infiltrating analog networks are likely to appear.

Much promise in thwarting the efforts of (at least known) technical fraud is attributed to the expected replacement of analog systems with digital systems. For example, digital encryption, frequency switching and authentication methodologies, such as GSM, CDMA and TDMA, are already being implemented in the growing digital networks of Europe and the Middle East. Similar precautions are also expected to become prevalent in the United States as the use of digital networks surpasses the use of analog networks by the end of 1998. Unfortunately, while the new precautions of digital technology might result in dwindling instances of technical fraud, increasing instances of alternative credit risk methodologies are also likely to appear. For example, instances of what will be referred to hereinafter as subscriber fraud have already been reported in countries where digital networks are becoming prominent.

In subscriber fraud, a defrauder secures authorized services from a service provider, but secures such services by falsification of the service user's identity. For example, a credit risk might submit false identification information to a service provider employee while applying for services. A defrauder might alternatively supply bona fide information during the application process, but without an intention to pay for credited (or subscription) services. In another form, a defrauder might similarly supply bona fide information, but the information might identify another individual or interest. For example, an applicant for services might provide information that identifies a subscriber of the same or another service provider. The subscriber information might have been purchased from an unscrupulous service provider employee or another source, such as public information sources. A defrauder might also obtain another person's identifying information by submitting a change-of-address form to the postal service and then copying the information from that received in the other person's mail. A still further subscription fraud example is roaming subscription fraud. In roaming subscription fraud, a defrauder typically secures unlimited access to services outside the area serviced by a "home" service provider ("roaming") using a fictitious or copied name (i.e. an alias), and then extensively uses the services of "foreign" service providers. Since the home service provider will not be billed by the foreign service provider for some period of time, the defrauder's usage will remain hidden from the home service provider during that time. The defrauder can then move on to another unsuspecting home service provider.

PRIOR ART

Several attempts have therefore been made to identify credit risks. Some attempts have been directed at identifying credit risks during the application process (i.e. when application data is supplied by the customer), while others have focused on identification after authorization and service activation by a service provider. These attempts are briefly described as follows.

LightBridge (a New England company) provides a computer-based system that performs name and address verification at the time of a customer's application for service. The LightBridge system utilizes electronic credit bureau reports to flag names of known defaulters (i.e. applicants with bad credit histories). The system further utilizes a zip code database to flag inconsistencies between the address given by an applicant for services and known area-to-zip code correlations.

Other application process methods include not accepting incomplete information in an application for service, and further, mailing welcome letters to new customers (or "subscribers") and flagging those letters that are returned by the postal service. Many companies might also utilize credit reporting agencies (such as TRW and Equifax, in the United States). These agencies gather information from credit card companies, banks, courts and time payment filings and then provide credit rating and summary "credit-worthiness" information to subscribing companies.

Alternatively, a service provider might seek automated post service activation credit risk identification systems from Coral Systems of Longmont, Colo., GTE of Florida, Subscriber Computing, Inc. of Irvine, Calif. or others. These systems perform potential credit risk notification first by flagging when contact telephone numbers provided in the customer's application are not dialed on the customer's assigned service for an extended period of time. The systems further flag a service provider when a customer's assigned service usage exceeds a credit limit or a selectable time and frequency threshold. Usage of special calling features (such as 3-way calling) and calls to suspect destination countries are also flagged, among other notification options.

Another post activation alternative is a user ID verification service provided (as a subscription service to service providers) by such companies as Authentix (U.S.). Authentix, for example, intercepts calls from a customer of a subscribing home service provider as roaming is attempted. Once intercepted, the call is switched to an Authentix service center. Once switched, a human operator or an Interactive Voice Recognition (IVS) system questions the caller regarding application data. If a caller provides incorrect application data, then the call is flagged; otherwise, roaming is authorized and the call is returned to the roaming procedure.

Still further post activation alternatives include forming credit risk categories and assigning each customer to a category based upon payment history for the service.

Unfortunately, none of the conventional system alternatives have been wholly successful in identifying potential credit risks generally, as more specifically relating to communications, or as even more specifically relating to wireless telecommunications. Application process systems, for example, rely on information that is readily obtainable and can be modified either directly or through the passage of time. Such systems further fail to identify those credit risks that have successfully avoided prior reporting and have further obtained identification information that at least appears bona fide. Such methods further fail to flag (or "warn") a service provider of questionable activities after service activation, either by an authorized customer or by an infiltrator.

Conventional post-activation alternatives are also problematic. Conventional automated systems, for example, fail to identify credit risks during the application process. Further, utilizing basic usage criteria has not proven to be a wholly reliable indicator of a potential credit risk and fails to identify roaming subscription fraud. Calling patterns and needs might change for even the most pragmatic user. It is therefore likely that these systems will result in unfair accusations against good customers in similar or greater proportion to credit risk identification.

User-ID verification systems are also problematic, for example, in that the information relied upon during verification is at best only as reliable as the information given during the application process. Further, even a defrauder committing technical fraud might "overhear" or otherwise obtain the verification information. Such systems also present an annoyance to a bona fide customer, particularly one who might frequently utilize roaming services.

None of the conventional post activation system alternatives further prevent a credit risk from utilizing multiple unrelated service providers, such that usage with any specific supplier is within verified limits. The systems further fail to distribute known information in a manner most likely to identify a potential credit risk. In addition, none of the conventional alternatives provide a wholly reliable method for identifying a user of a service.

Accordingly, there is a need for an apparatus and methods for reliably identifying potential credit risks both during application for services and throughout service usage, and a system that is minimally intrusive.

SUMMARY OF THE INVENTION

The preferred high credit risk detection system (hereinafter "detection system") is formed on the presumption that, despite the introduction of newer and better precautions against technical fraud, defrauders will inevitably succeed in thwarting such protections. A further presumption is that both defaulter and defrauder type credit risks will attempt, and some successfully, to secure services from a service provider.

It is therefore an object of the invention to provide a system for detecting technical fraud.

It is another object of the present invention to provide systems for detecting high risk customers, which systems utilizes biometric data in detecting technical fraud.

The above recited objects, among others, are obtained by the present invention through the use of a system for detecting subscription fraud in connection with any consumer related service which requires continuous access and payment over time. The system includes:

means for determining a subscription fraudster (i.e. a credit risk) or someone whom has not fulfilled previous payment obligations for access to service, at or soon after the point of service application, by comparing at least one biometric value against those on file which are associated with past payment default;

means of utilizing non-threshold and non-market characteristic profile information (i.e. stored data, such as phone numbers, relating to the individual's service usage, which data may have been filtered to remove data that cannot be used to detect fraud) which is not part of the data captured on the service order application for identifying an individual who has defrauded or defaulted on previous subscriptions for consumer services;

means for viewing, storing, forwarding, and comparing biometric and non-application subscriber profile data which is not based on thresholds, transactions, nor market characteristics across many points of service activation, billing, and management; and means for combining and sharing biometric and user profile data across multiple service providers to restrict access to services at the time or shortly after application processing.

BRIEF DESCRIPTION OF THE DRAWINGS

These and other objects, features and advantages of the present invention are better understood by reading the following detailed description of the preferred embodiment, taken in conjunction with the accompanying drawings, in which.

DETAILED DESCRIPTION OF A PREFERRED EMBODIMENT

For clarity sake, the embodiment discussed herein will be directed primarily toward a high credit risk detection system for service providers providing services rather than products. More specifically, the discussion will focus on a system that allows cellular telephone system service providers to detect potential credit risks either before or while extending credit to customers.

It will, however, become apparent to those skilled in the art, in view of the discussion herein, that the invention is applicable to many other fields in which credit risk detection is warranted, and with regard to providers of both products and services. It will further be understood that the present invention is also applicable to such detection where funds are transferred on a transaction-by-transaction basis, among other applications.

Figure 1:
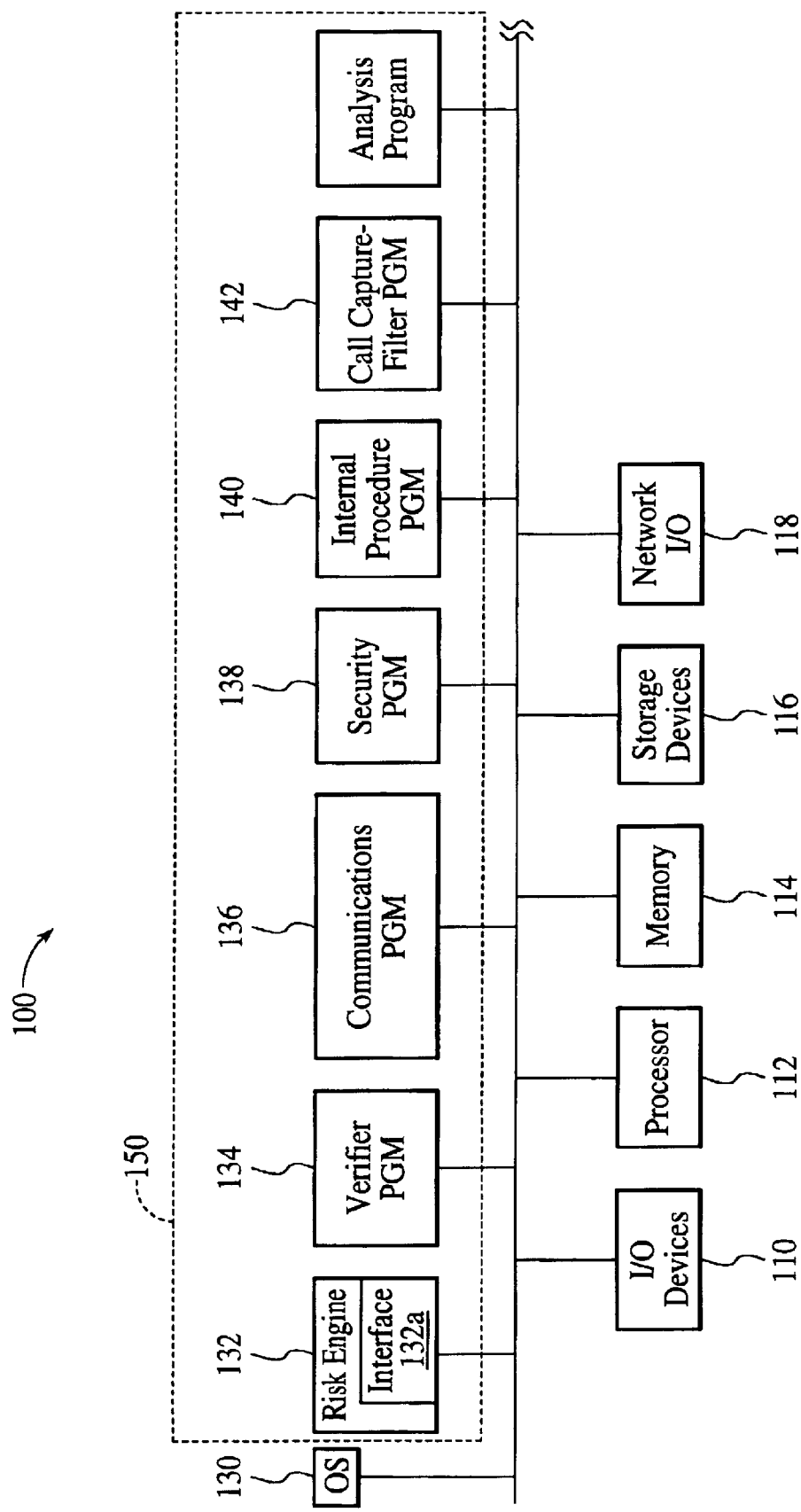
FIG. 1 illustrates a functional block diagram generally illustrating a system for detecting high risk customers according to a preferred embodiment of the invention.

As is generally illustrated in FIG. 1, a preferred system 100 for detecting high credit risk customers according to the invention preferably comprises a number of networked processing systems, and more preferably, personal computers or "PCs". For clarity sake, each such processing system will be referred to in terms of its function, either as a workstation or network server. The system further preferably includes wireless devices and a cellular service network, which are not shown.

Each processing system (as exemplified by processing system 100), preferably comprises electrically coupled hardware elements including I/O devices 110, processor 112, memory 114, storage devices 116 and network I/O 118. Each processing system further comprises coupled software elements including operating system 130 and risk program 150. Risk program further includes coupled software elements including risk engine 132, which includes interface 132a, verifier 134, communications program 136, security program 138, internal procedure program 140 and call capture-filter program 142.

It will be apparent to those skilled in the art that several variations of system 100 elements are contemplated and within the intended scope of the present invention. For example, while connection to other computing devices is illustrated as network I/O 118, wired, wireless, modem and/or other connection or connections to other computing devices (including but not limited to the internet and a conventional telephone system) might be utilized. A further example is that the use of distributed processing, multiple site viewing, information forwarding, collaboration, remote information retrieval and merging, and related capabilities are each contemplated. Various operating systems and data processing systems can also be utilized, however at least a conventional multitasking operating system such as Windows95®, Windows NT® (trademarks of Microsoft, Inc.) or Unix running on an IBM® (trademark to International Business Machines) compatible computer are preferred and will be presumed for the discussion herein. I/O devices 110 can comprise any number of devices and/or device types for allowing a user to interact with a PC. Input devices, for example, include but are not limited to a keyboard and a mouse. Other input devices, such as speech recognition and a scanner, can also be utilized. Output devices preferably include a CRT and/or a flat panel display (i.e. a monitor); other audio, video and further output devices can, however, also be utilized. Workstations further preferably include, among the I/O devices, a biometric device and a scanner (not shown).

Figure 2:
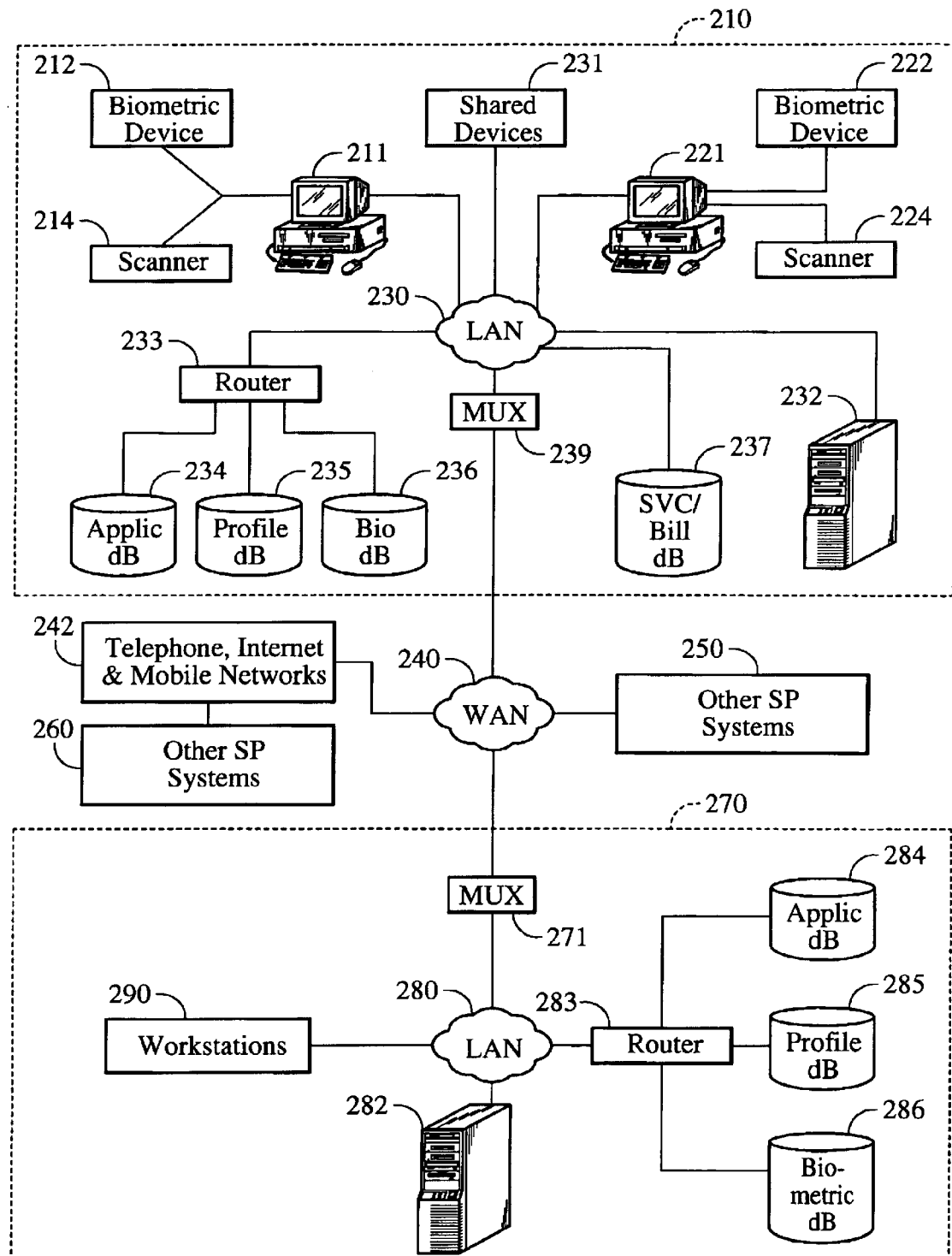
FIG. 2 illustrates a communication system according to the present invention in which service provider systems are connected to a verification center system.

Turning now to FIG. 2, the preferred detection system performs credit risk detection both locally to a service provider, and in a distributed manner utilizing a verification center as multiple service provider data gathering and verification point. As shown, a number of service providers systems 210, 250 and 260 are preferably connected to verification center system 270 via wide area network ("WAN") 240. A larger service provider (as exemplified by providers 210 and 250) will typically be connected to WAN 240 through a local area network ("LAN") at the service provider location. Other, generally smaller, service providers will be connected to WAN 240 through a telephone, internet or mobile connection 242. Still other service provider systems might be connected through a telephone service directly to verification center 270. Other service providers might further utilize more than one connection path.

Conventional connections and communications protocols can be utilized in all cases. For example, communication through a telephone network can be accomplished using an analog or digital modem, which might further be routed using, for example, a local phone company PSTN dial-up network. Data may be further routed through remote frame relay nodes and international frame relay networks. Conventional protocols for data transfer, including but not limited to TCP/IP can also be used.

Service provider system 210 exemplifies a typical service provider system configuration. As shown, a number of similarly configured workstations are provided for various service provider agents ("agents"). Workstation 211, for example, preferably includes connections to a biometric device 212, a scanner 214 and LAN 230. Workstation 221 is illustrated as having a similar configuration, although other workstations might share these and other peripherals (such as printers, modems and facsimile machines) as indicated by shared devices 231. LAN 230 is further connected to network server 232 and, via router 233 to storage devices storing customer information. Such customer information preferably includes application data stored in an application database 234, profile data stored in a profile database 235 and biometric data stored in a biometric database 236. (It will be appreciated that customer data might additionally or alternatively be stored in internal network server storage devices.) As will be discussed, the customer information primarily relates to service provider-specific applicants, customers, and identified potential or actual credit risks.

LAN 230 is further preferably coupled through multiplexer 239 to WAN 240, thereby allowing each workstation to conventionally communicate with network server 232, to store and retrieve data from databases 234, 235 and 236, and to transfer data to and from verification center system 270. Such a configuration also enables workstations 211 and 222 to communicate with other service provider systems 250 and 260.

Verification center system 270 is preferably configured in a manner similar to that of service provider systems. Server 282 is connected via LAN 280 and multiplexer 271 to WAN 240, thereby enabling communication between LAN 280 and other devices connected to LAN 280 and WAN 240. Verification center system 270 further includes storage devices storing customer information for subscribing service providers, as well as identified potential or actual credit risks. Such customer information preferably includes application data stored in an application database 284, profile data stored in a profile database 285 and biometric data stored in a biometric database 286. As with service provider systems, customer data might additionally or alternatively be stored in internal network server storage devices.

Further connections to customer devices (not shown) are preferably provided through telephone, internet and/or mobile networks. Such connections are provided primarily to enable wired and wireless telephone service providers, internet service providers and utility service providers to gather information relating to service usage by respective customers, as will be discussed further herein.

It will be understood by those skilled in the computer arts, however, that a variety of network configurations are utilized in accordance with specific operating needs, cost, technological advancements and other factors. Even extensive variations will not result in significant detrimental impact specific to the system and methods of the invention.

Broadly stated, identification of potential credit risks or "verification" is preferably conducted in what can be viewed as two stages, with further effectiveness being achieved through data types utilized, data selection and data distribution. First, verification is conducted using both data stored in a service provider system and data from all subscribing service providers stored in a verification center system. The data utilized preferably includes customer data and known potential credit risk data, and can also include related data gathered and/or produced by analysis by service providers and/or the verification center.

As noted, preferred data types include application data, profile data and biometric data. Application data preferably comprises information collected from customers during the application process. Such data preferably includes the applicant name, address, phone number, business information and contact information. Such information, for example, enables identification of a user and calling pattern verification criteria, such as that utilized in conventional verification.

Profile data preferably includes information gathered concerning customer service usage after the application process. In the case of mobile communications, for example, phone numbers dialed by a customer (and/or known credit risk) are gathered and filtered for verification against future calls made by the same and other customers. In the case of internet access, for example, email addresses and URLs are preferably gathered and filtered for similar uses. Such profile data, particularly in view of the two stage verification discussed earlier and data distribution (discussed below), are especially useful for identifying the actual user of a service. Profile data, for example, enables identification of instances of technical fraud and roaming fraud, since patterns utilized in the past by credit risks will likely be repeated by the credit risk. Another use of such data is for identification of credit risks who dodge detection by switching from one service provider to another and/or those who move from one region to another.

Biometric data can include signatures, hand geometry, finger prints, palm prints, voice prints retinal or iris scans, vein patterns or other data that (with little exception) uniquely identifies a particular individual and is largely unalterable. Finger prints are preferably used for identification purposes given the vast records already available and their inherent reliability. Other biometric data types might, however, be substituted and, given the current state of the art in mobile communication devices, handwriting might be a likely (though lesser preferred) alternative at present. Systems for utilizing biometrics are discussed, for example, in U.S. Pat. No. 5,386,104 to Sime with regard to usage thresholds and in U.S. Pat. No. 5,229,764 to Matchett et al. as a sole verification means in ongoing banking transactions.

Figure 3:
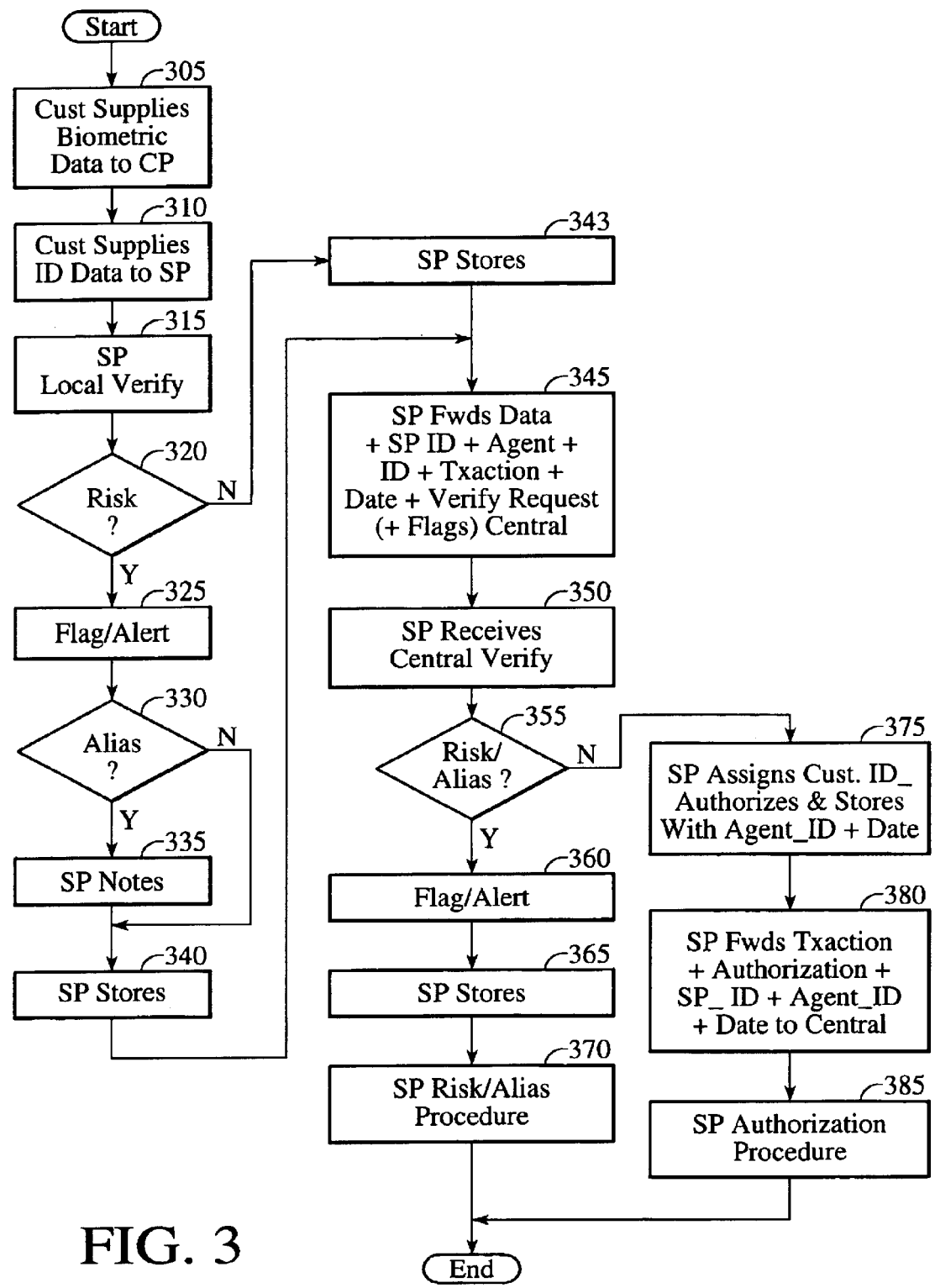
FIG. 3 illustrates a preferred method for identifying potential credit risks during an application-for-credit using a service provider system according to the invention.
Figure 4:
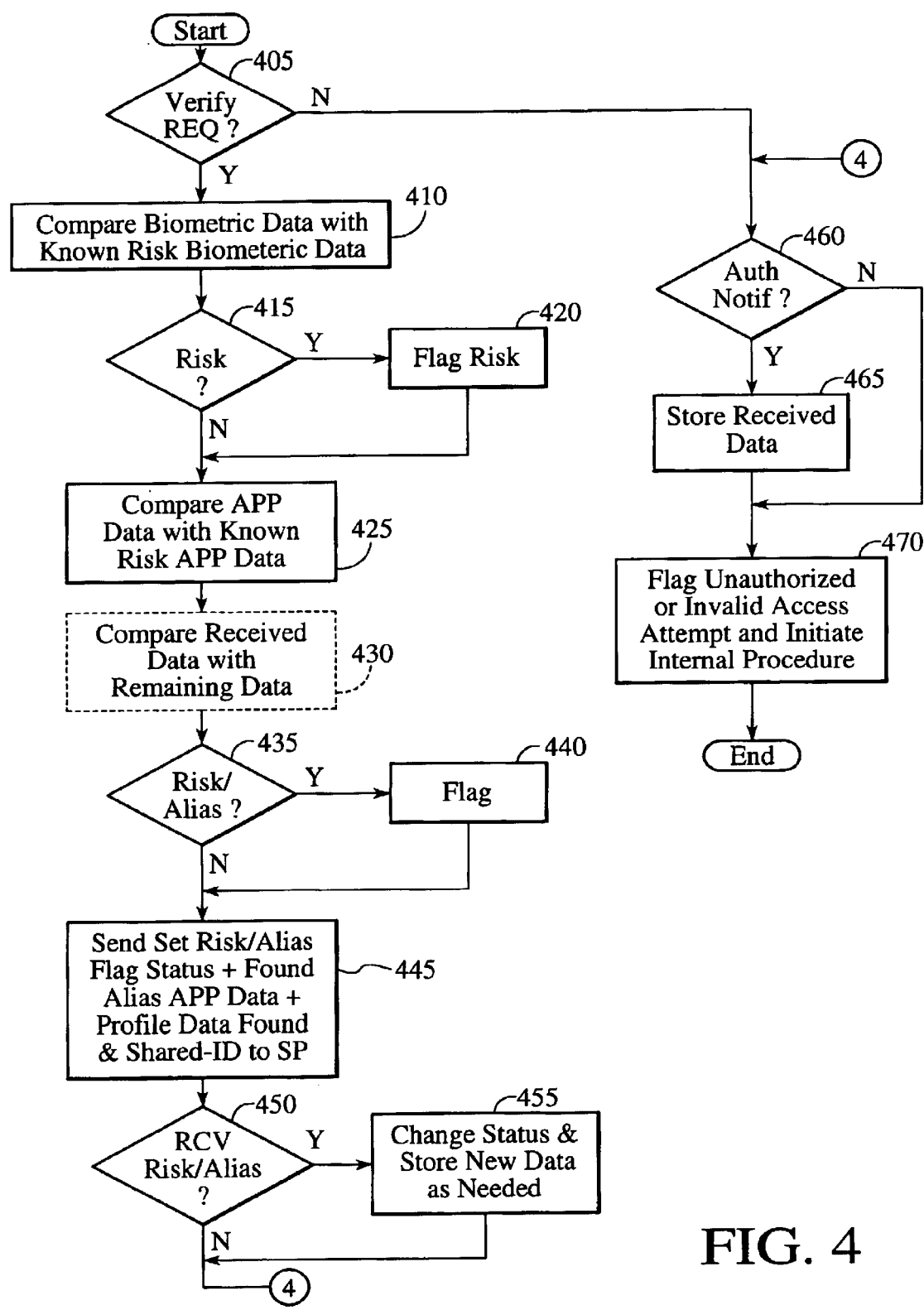
FIG. 4 illustrates a preferred method for identifying potential credit risks during an application-for-credit using a verification center system according to the invention.

The FIG. 3 and FIG. 4 flowcharts, with reference to FIGS. 1 and 2 illustrate how potential credit risks are preferably identified during a preferred customer application-for-credit according to the invention. FIG. 3 illustrates a preferred method executed utilizing a service provider system while FIG. 4 illustrates a preferred method executed by a verification center system.

As shown by FIG. 3, in step 305, a customer supplies a service provider agent with biometric data. In the case of a thumb print, for example, the customer places his/her thumb on biometric device 212 (FIG. 2), the thumb is scanned by biometric device 212 and resultant thumb print is stored within workstation 211. Other biometric data types can be similarly obtained using a corresponding scanner, camera or other biometric device. Biometric data can alternatively (though less preferably) be obtained using mechanical means, the results of which can then be scanned. Scanning and storage are preferably invoked through activation of risk engine 132 (FIG. 1).

In step 310, the customer supplies the agent with identification data (i.e. application data, as already discussed). The agent preferably scans the identification data using scanner 214, uses object character recognition (OCR) software to convert the data into characters and then stores the data as with the biometric data. Alternatively, voice recognition and/or manual data entry might also be used. In step 315, the agent initiates a verification of the gathered data using data stored locally (i.e. in a service provider database).

If, in step 320, the customer data matches that of an identified credit risk, then verifier program 134 stores a corresponding risk flag and risk engine 132 alerts the agent through interface 132a (FIG. 1). If further, in step 330, prior identification data for the customer is found, but differs from that now supplied, then an alias flag is stored by verifier program 134 in step 335. Next, risk engine 132 stores the application data and biometric data along with activated flags, a transaction number, the date and the agent's identification number ("agent ID") respectively in databases 234 and 236 (FIG. 2) in step 340, and then proceeds to step 345.

If instead, in step 320, a credit risk is not identified, then risk engine 132 stores the application data, along with a transaction number, date and agent ID in step 343, and then proceeds to step 345.

In step 345, risk engine invokes communications program 136 (FIG. 1), which establishes a connection to verification center 270 (FIG. 2) and sends (or "uploads") to verification center 270 the biometric data, application data and flags, as well as a transaction number, service provider ID, agent ID, date and a request for verification. In step 350, workstation 211 receives the verification center results.

If, in step 355, a credit risk or customer alias has been identified, then, in step 360, risk engine 132 respectively sets a risk flag and/or an alias flag and alerts the agent of such risk and/or alias status via interface 132a. In step 365, risk engine 132 updates the information stored in step 340 or step 343 with risk and/or alias notification (according to flag settings) and further stores any alias data and a shared identifier received from verification center 270. (The shared identifier enables tracking of a customer according to a same designation among service providers and the verification center.) If instead, in step 355, no risk or alias flags have been set, then risk engine 132 invokes internal procedure program 140, which assigns a customer ID and authorization, and further updates the stored information with the customer ID, authorization, agent ID and date. Then, risk engine 132 invokes communications program 136, which transfers the transaction, authorization, service provider ID, agent ID and date to verification center 270, in step 380, and which further executes remaining authorization procedures of the service provider.

A security program 138 is further invoked in step 350 and operates in a conventional manner to determine whether an authentic response has actually been received from verification center 270 and, if not, sets a retry flag. Subsequent failed attempts are further flagged by security program 138, in which case, the remaining steps are halted and the agent (and optionally, a service provider authority) is notified.

It will be appreciated by those skilled in the art in view of the discussion herein that the specific application information might vary according to specific service provider needs. In addition, the specific data sent to verification center 270 and/or returned by verification center 270 to service providers might vary based upon business, industry, confidentiality and/or other concerns. One example is that telecommunications services authorization information might include an assigned telephone number and special services, and cellular services authorization information might further include roaming privileges. Another example is that product sales might include a product identifier, one or more product classifications and/or price. A still further example is that names and/or addresses of individuals might be withheld by a service provider for confidentiality reasons; it is however, preferred that such information is transmitted to and from a verification center due to the increased reliability of subsequently performed verifications for identifying and against identified potential and actual credit risks. Security program 138 can further be alternatively invoked by communications program 136.

Turning now to FIG. 4, with reference to FIGS. 1 through 3, verification center system 270 (FIG. 2) preferably responds to application-related requests (indicated by a received application parameter or by conventional data parsing) as illustrated in the flowchart. Verification center server 282 runs a similar risk program to that of service provider system 210.

As shown, if, in step 405, invoked security program 138 (FIG. 1) determines that a valid verification request has been received from an authorized service provider system, then, in step 410, risk engine 132 compares the received biometric data with known risk biometric data stored in biometric database 286 (FIG. 2). If further, in step 415, invoked verifier 134 identifies a credit risk, then a risk flag is set; otherwise, risk program 150 proceeds to step 425. In step 425, verifier 134 compares received application data with known risk application data stored in application database 284. In step 430, verifier optionally further compares received biometric and application data with remaining data respectively stored in biometric database 286 or application database 284. (While a complete verification of both known risk and customer data is preferred for respectively identifying known as well as formerly unknown credit risks or aliases, cost and delay to a subscribing service provider and other factors might require that step 430 be executed only for specifically opting subscribers.)

If, in step 435, a risk or alias has been detected, then a respective risk and/or alias flag is set in step 440. In step 445, communications program 136 (FIG. 1) sends (or "downloads") to the requesting service provider risk and alias status (i.e. flag set or not), as well as found alias application data, corresponding profile data (if any) stored in profile database 285, and a shared ID. The shared ID is either found in application data or is created in response to an apparently not-yet-assigned individual. (The shared ID and corresponding data are preferably modified in the event that apparently multiple customers are determined to actually be the same customer.) If further, in step 455, a request is received with a corresponding risk and/or alias flag set, then risk engine 132 updates a corresponding status and stores newly received alias application data correspondingly with biometric data and the shared ID.

If, in step 460, authorization notification is received, then, in step 465, risk program 150 stores the received data correspondingly with biometric data and the shared ID. In step 470, risk program 150 flags unauthorized or invalid access attempts and initiates internal procedure program 140 (FIG. 1).

While not shown for clarity sake, security program 138 (FIG. 1) further operates in a conventional manner to assure that, (for example) following step 445, a requesting service provider has properly received sent data, and, following step 465, to acknowledge receipt of data. Security program 138, in this respect, might be embodied within a conventional data transfer protocol or might further be implemented as a part of communications program 136 (as with a service provider security program). Such communication authentication and confirmation is further preferably utilized in all applicable data transfers. Security program 138 might also be utilized to filter data to be stored or further prevent storage of selected data entirely, for reasons similar to those given above (i.e. business, confidentiality, etc.). Such filtering and/or prevention (as well as other security and internal procedure features) should further be controllable either directly or through verifiable authorization respectively by a duly authorized service provider or verification center agent. It should be noted, however, that larger amounts of relevant data distributed among service providers and a verification center (within confidentiality, legal and other constraints) will typically provide a greater degree of verification accuracy.

Figure 5:
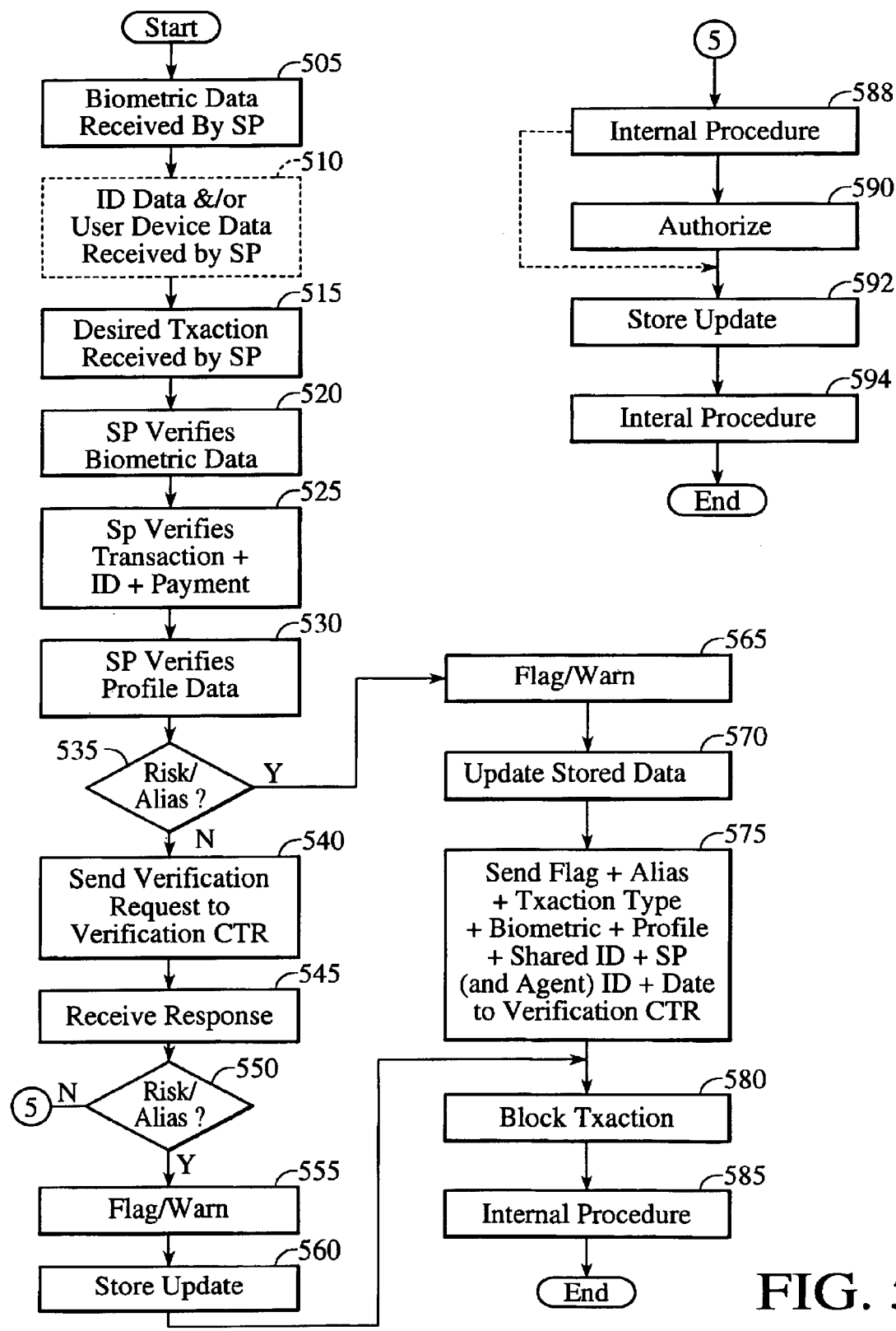
FIG. 5 illustrates a preferred method for identifying credit risks during customer utilization of a service provider's products and/or services utilizing a service provider's system according to the invention.
Figure 6:
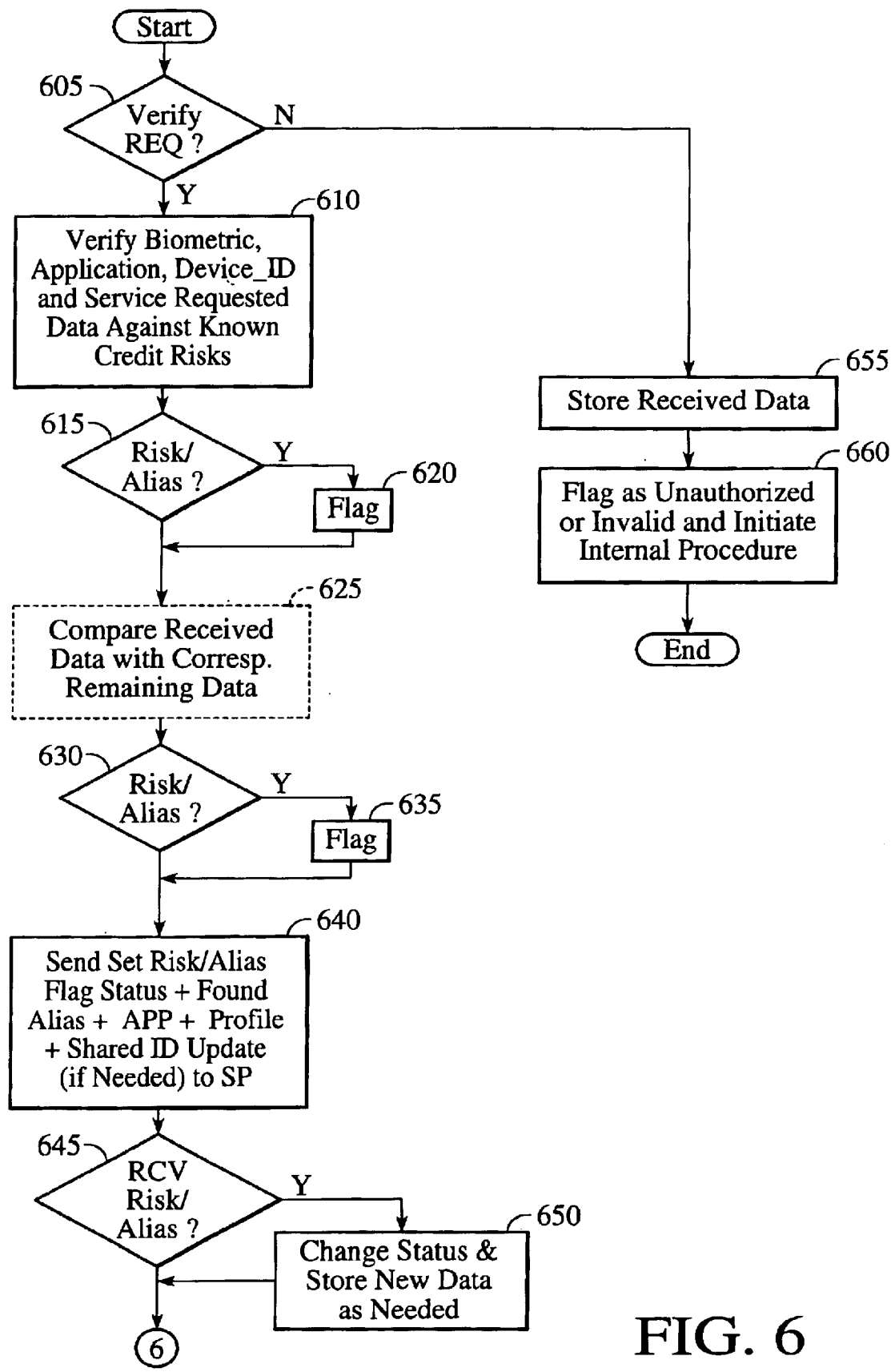
FIG. 6 illustrates a preferred method for identifying credit risks during customer utilization of a service provider's products and/or services utilizing a verification center system according to the invention.
Figure 7:
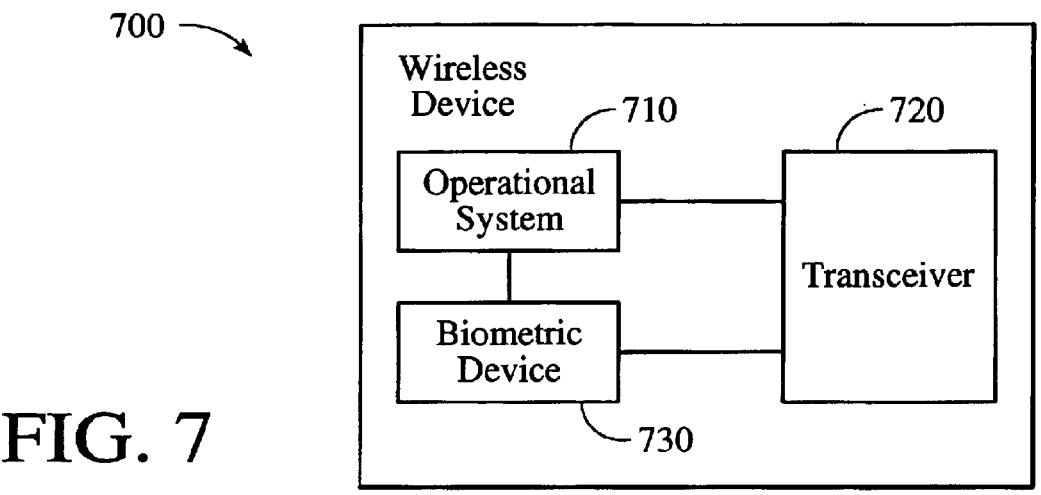
FIGS. 7 and 8 illustrate a preferred wireless device used in accordance with the methods illustrated in FIGS. 5 and 6.
Figure 8:
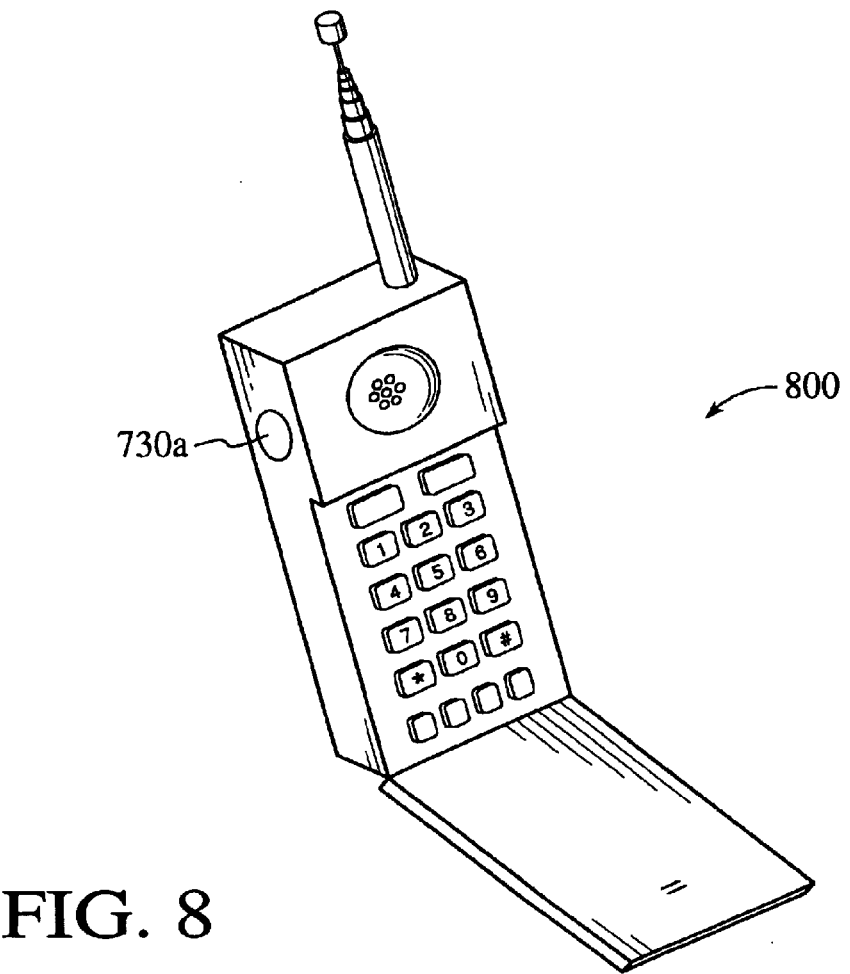
Figure 9A:
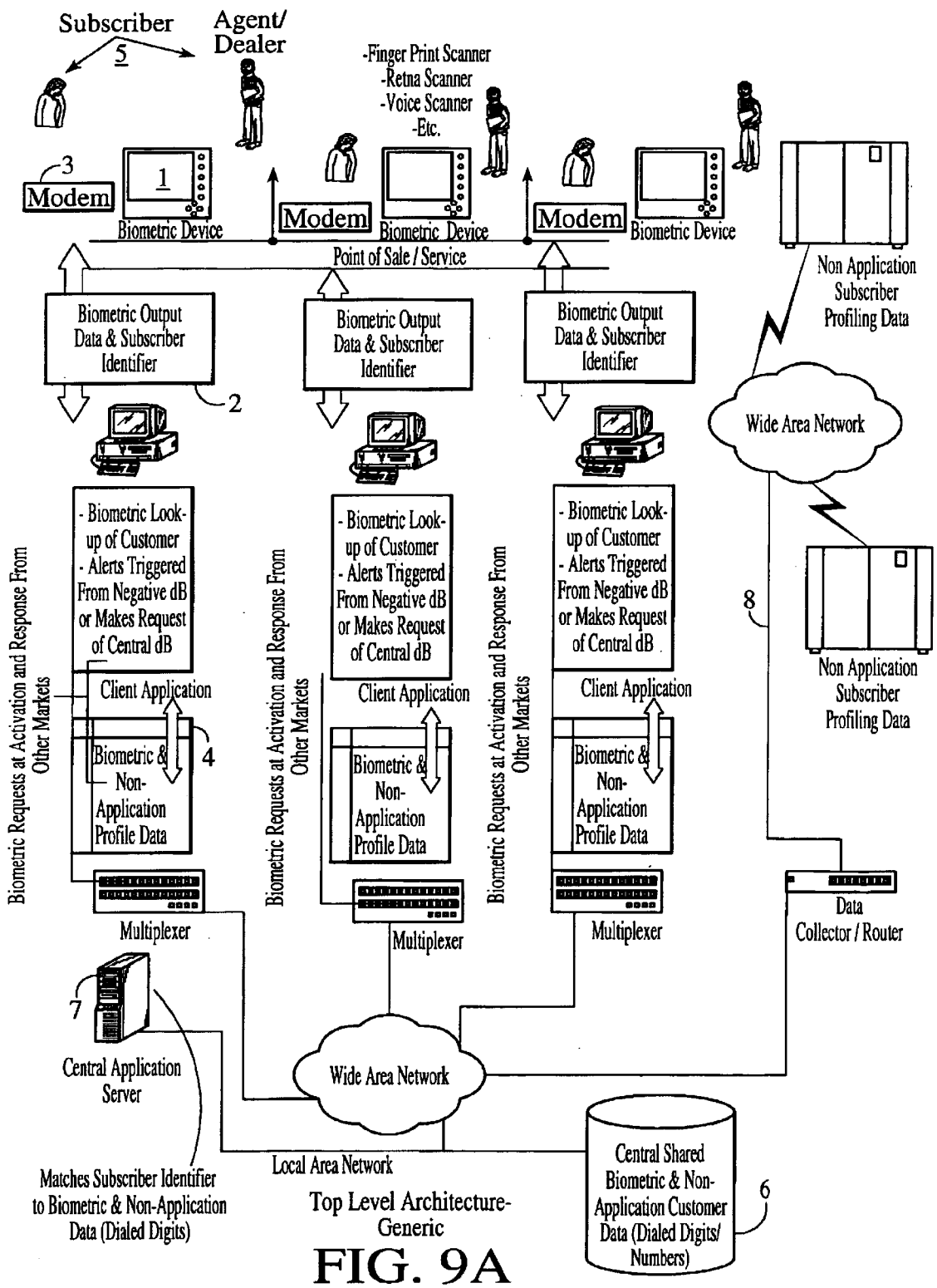
FIGS. 9A–9E illustrate the present invention from a user/provider point of view.
Figure 9B:
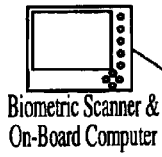
Figure 9B:
Figure 9B:
Figure 9B:
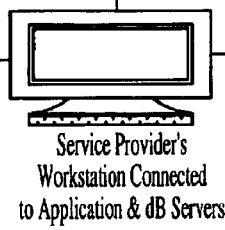
Figure 9B:
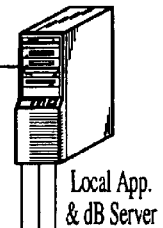
Figure 9B:
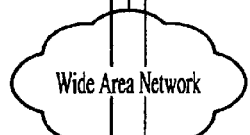
Figure 9B:
Figure 9C:
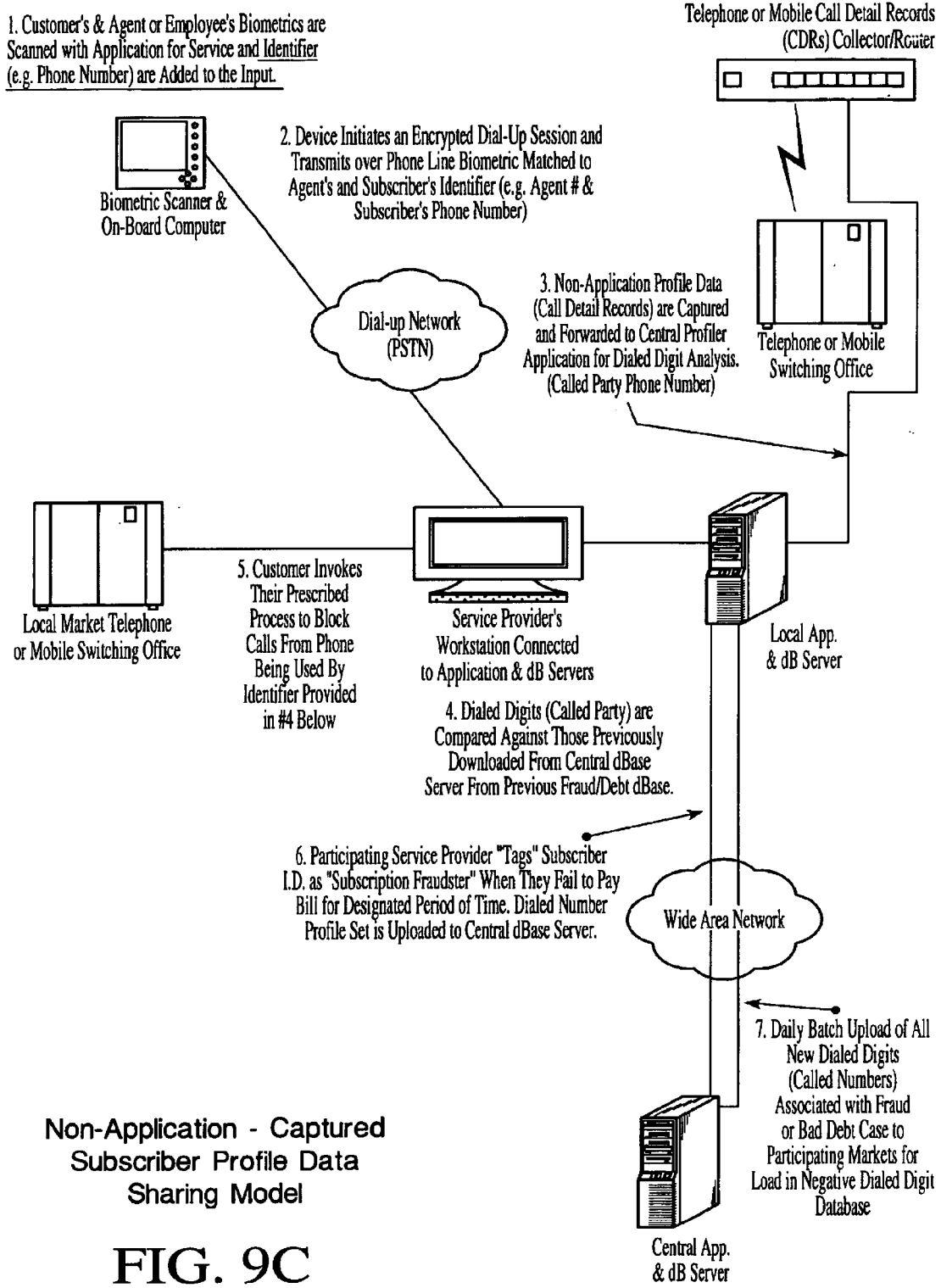
Figure 9D:
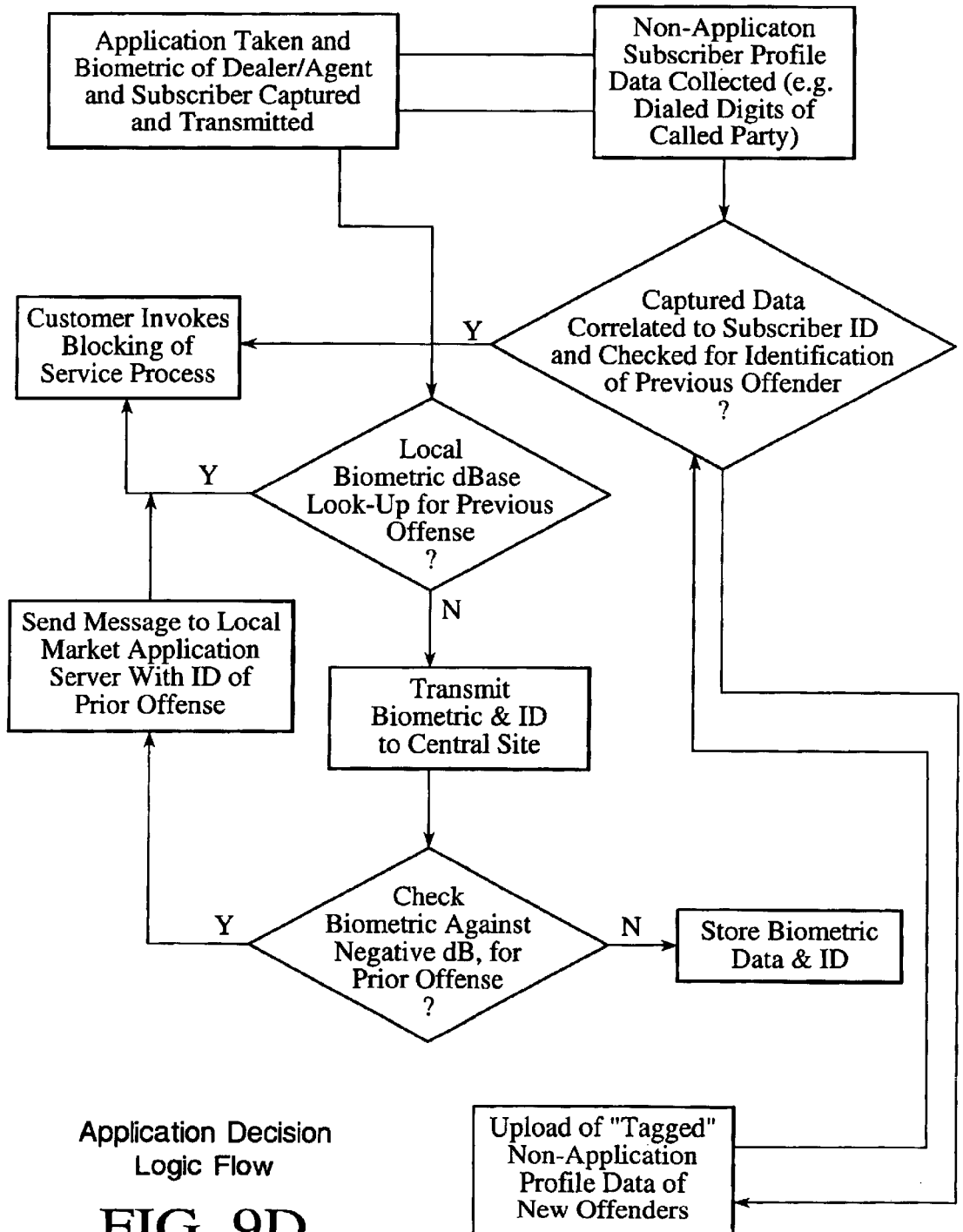
Figure 9E:
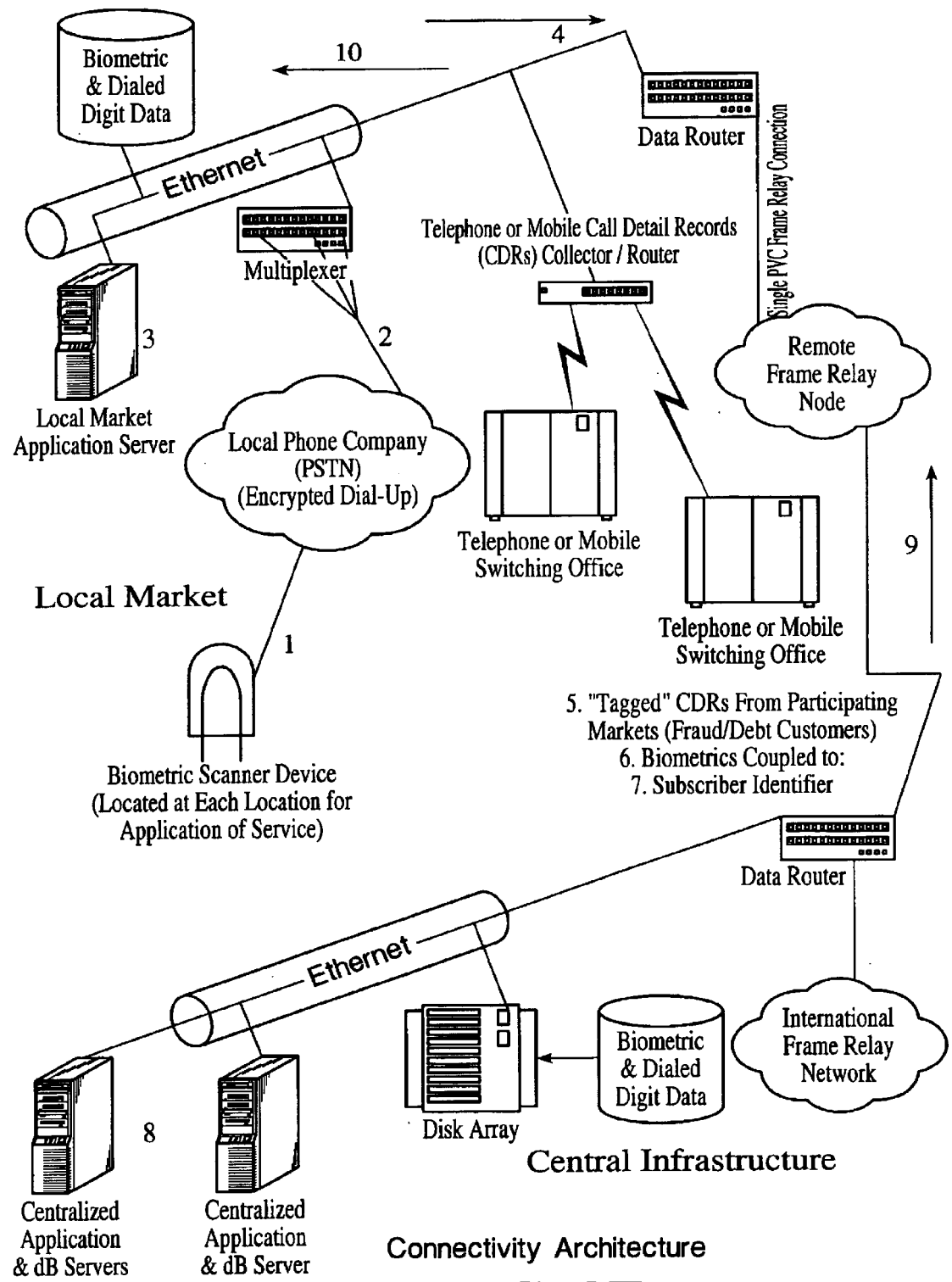

FIGS. 5 through 8, with reference to FIGS. 1 and 2, illustrate how potential credit risks are preferably identified during customer utilization of a service provider's products and/or services, according to the invention. FIG. 5 illustrates a preferred method executed utilizing a service provider system while FIG. 6 illustrates a preferred method executed by a verification center system. FIGS. 7 and 8 illustrate a preferred wireless device in accordance with the methods of FIGS. 5 and 6.

As shown by FIG. 5, in steps 505 through 515, service provider system 210 (FIG. 2) respectively receives into risk program 150 (FIG. 1) biometric data, identification data and/or user device data, and a user's desired transaction. As discussed earlier, it might be necessary to rely on data other than biometrics (particularly preferred biometrics data) to the extent that biometrics devices remain absent from specific businesses and devices (such as wireless communications devices). Further, the specific data gathered on a transaction-by-transaction basis might well vary in accordance with such absence, potential interception and issues of convenience, among others. For example, unless data is stored in a particular device, most customers would likely consider having to provide more than a password or other short application data type inconvenient. It is presumed for clarity sake, however, that all of the listed data types are gathered at each transaction.

In steps 520 through 530, a service provider system performs local verification. In step 520, verifier 134 (FIG. 1) compares received biometric data with known risk biometric data stored in biometric database 236 (FIG. 2). Next, in step 525 verifier 134 compares received application data (and/or user device data) with known risk application data stored in application database 234, and further compares customer allowable transactions and payment history with data stored in service and billing database 237. In step 530, verifier 134 still further compares the dialed number with known risk profile data stored in profile database 235.

While steps 520 through 530 are illustrated as being performed sequentially, such steps can also be performed on an exclusive basis. Stated alternatively, performing all of these verification steps (i.e. sequential) might reveal a credit risk on more than one basis, for example, both that a user is not authorized by a bona fide customer to use his/her service, and the identification that the credit risk supplies. Conversely, skipping remaining verification steps when a credit risk is detected (i.e. exclusive) results in a decreased use of available workstations.

Continuing at step 535, if the verification does not reveal a risk or alias, then, in step 540, risk program 150 sends to verification center system 270 a verification request including a shared ID, service provider ID, the date, a transaction number and an agent ID (although automatic verification utilizing risk program 150 is preferred), as well as supplied biometric and application data and/or user device ID, and requested service data. (Requested service data, as discussed earlier, includes, for example, a number dialed for telecommunications services.) In step 545, a response from verification is received. If, in step 550, the response does not flag a risk or alias, then risk program 150 continues at step 588; otherwise risk program 150 continues at step 555.

In step 555, risk program 150 sets a risk flag and/or an alias flag, and (optionally) warns a service provider agent. In step 560, risk program stores alias data and profile data respectively in databases 234 and 235. (While extremely unlikely, altered biometric data and the occurrence of such alteration are stored in biometric database 236.) An altered shared ID is similarly stored in application database 234. In step 580, invoked security program 138 preferably blocks the transaction, and then in step 585, internal procedure program 140 is further invoked.

Despite passing verification center scrutiny in step 550, in step 588, invoked internal procedure program 140 might further be utilized to store a record of the transaction. Preferred transaction element storage examples (which might also be added to other risk program elements) include late payment and/or an attempt to secure unauthorized services and/or service features. Internal procedures might further result in blocking authorization (step 590) of a transaction, and thereby proceeding to store updated data in step 592, and performing additional internal procedures in step 594.

It should be noted that the flagging of aliases preferably does not include aliases that are known and authorized by a service provider. For example, it is often the case in communications over the internet that a user might properly utilize an alias without intention to defraud. In fact, many email addresses do not provide an absolutely clear user identification. In such cases of authorized use, aliases can therefore be stored along with other identification and then used and verified interchangeably with the other identification. Further, as with other application information, proper aliases can be modified after the application process through proper authorization and conventional stored data modification. However, authorization by a duly authorized service provider agent and recordation of such authorization is again preferred. Updates further necessitated by changes of circumstance and/or errors induced into a customer's information (such as mislabeling a customer as a high risk) can also be modified in a similar manner.

Turning now to FIG. 6, with reference to FIGS. 1, 2 and 5, verification center system 270 (FIG. 2) preferably responds to service-related requests (indicated by a received service requested parameter or by conventional data parsing) as illustrated in the flowchart.

As shown, if, in step 605, invoked security program 138 (FIG. 1) determines that a valid verification request has been received from an authorized service provider system, then, in step 610, risk engine 132 compares the received biometric, application, device ID and service requested data against known credit risk data stored in databases 284 through 286. If, in step 615, a risk or alias is found, then a corresponding flag is set in step 620. Next, in step 630, verifier 134 optionally further compares the received data with remaining data respectively stored in biometric database 286 or application database 284. (As discussed, verifying all data might reveal a formerly unknown credit risk or a case in which an unauthorized user has accessed more than one customer service. Such checking might, however, be prohibitive for cost, business, bandwidth or other reasons.)

If, in step 630, a risk or alias has been detected, then a respective risk and/or alias flag is set in step 635. In step 640, communications program 136 (FIG. 1) sends (or "downloads") to the requesting service provider risk and alias status (i.e. flag set or not), as well as found alias, application and/or corresponding profile data (if any) stored in profile database 285, and any changes to the shared ID. If further, in step 645, a request is received with a corresponding risk and/or alias flag set, then risk engine 132 updates a corresponding status and stores newly received alias application data correspondingly with biometric data and the shared ID.

If instead, in step 605, an unauthorized or invalid request is received, then risk program 150 (FIG. 1) stores the received data correspondingly for further analysis in step 655, and then flags the request and invokes internal procedure program 140.

Known risk data is preferably stored in the same databases with biometric, application and other data, identified in each case by a set risk parameter associated with the corresponding data. Such a configuration provides for robust changes to the status of the associated data. Alternatively however, known risk data can be stored either in databases separated from non-known risk data or in a separate location of the non-known risk databases for identification purposes.

FIGS. 7 and 8 illustrate preferred wireless devices used by a customer to access a service provider system. Among the devices available for remotely accessing a service provider system are various models of portable computers (e.g. laptop, palmtop, organizers, etc.), cordless telephones and cellular telephones. As discussed, those devices that provide no ready means for reliably ascertaining any biometric data are preferably accommodated through user entry of application data and device-ID data and combination device data transmission. Preferably, however, such devices will more accurately identify a user through the use of biometric data, and more preferably, through the use of fingerprinting. Turning now to FIG. 7, biometric device 730 has been added to wireless device 700. Biometric device 730 is preferably added to device 700 by coupling biometric device 730 to both the existing operational system (i.e. hardware and software) 710 and transceiver 720. By utilizing such coupling, biometric devices similarly functioning as a peripheral controlled by existing hardware and existing software (e.g. the Microsoft Windows CE operating system), whether the host system is wired, wireless, essentially tied to a desktop or portable. In the case of a wired portable device, communication is preferably achieved through the use of a modem, and more preferably, a digital modem.

FIG. 8 further illustrates a portable telephone (e.g. wireless or cellular) operating in accordance with the functional diagram of FIG. 7 and preferably incorporating a fingerprint reader as a biometric device. As shown, fingerprint reader 730a is preferably positioned to be unobtrusive yet conveniently and comfortably accessed by a user holding the telephone for identification purposes.

FIGS. 9A–9E illustrate the present invention from a user/provider point of view. This includes illustrations of user/provider interactions that will typically occur, an overview of the hardware utilized, which hardware corresponds to that previously described, using terms analogous to those previously used, and a flowchart illustrating another embodiment of the application process.

Figure 10:
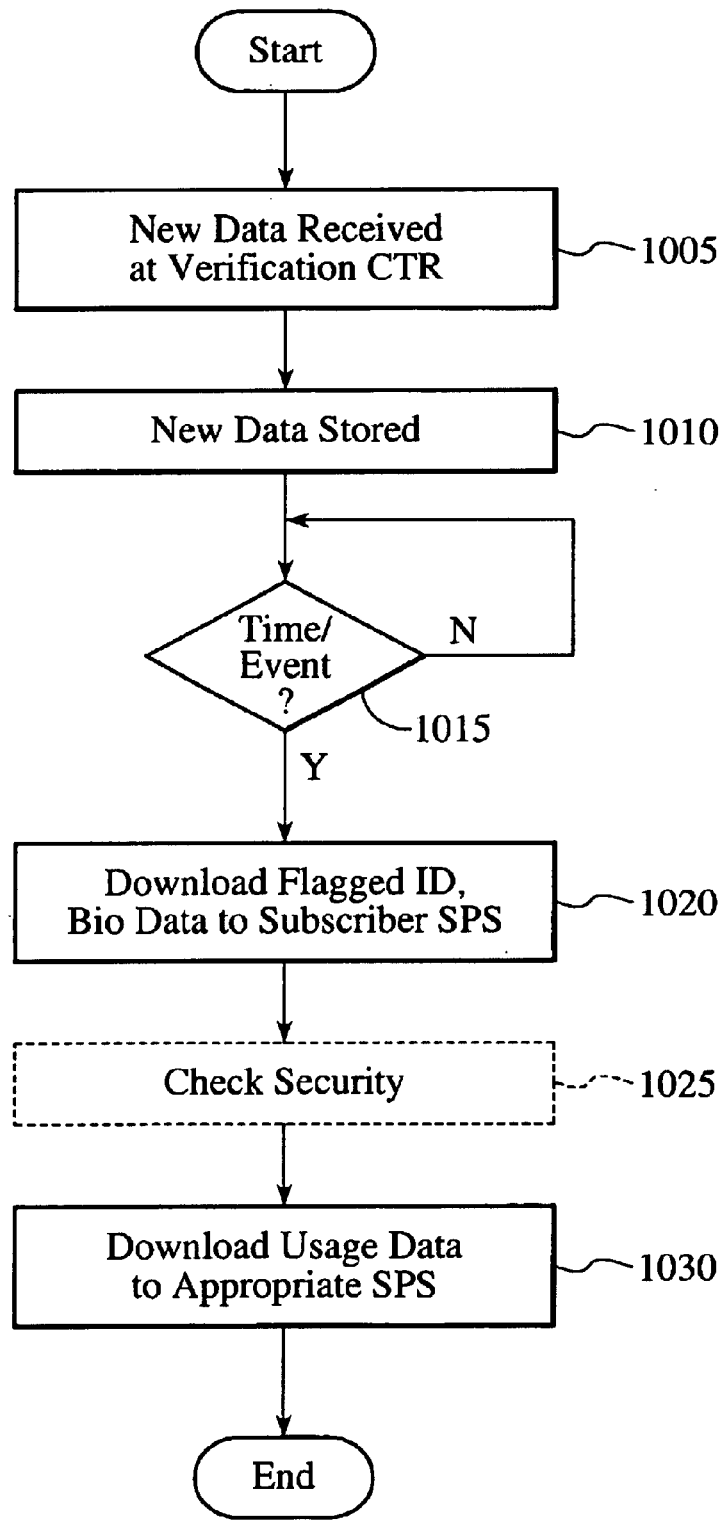
FIG. 10 illustrates a method of downloading information from a verification center system to a service provider's system according to the invention.

Turning now to FIG. 10, additional success in identifying potential high risks is preferably achieved by downloading newly discovered known risk data from the verification center to subscribing service providers. As noted, biometric, application, profile and other data is sent by subscribing service providers to the verification center during application and service provider system usage on an ongoing basis. Each dataset enables not only the identification of potential credit risk customers, but also non-customer credit risks utilizing a service provider system. For example, profile data of a known credit risk that has been filtered to remove commonly called and information similarly less useful for detecting calling patterns enables detection of use by the credit risk of a bona fide customer's service.

As shown in FIG. 10, new data is received by verification center system 270 in step 1005, and is then stored in step 1010. If, in step 1015, a predetermined time or event occurs, then, in step 1020, verification center system 270 downloads known risk biometric, identification and profile data, gathered since a last download, to subscribing service providers. Further, based upon confidentiality and/or other security features in step 1025 (as already discussed), verification center system 270 downloads industry-specific data to specially subscribing corresponding industry-specific service providers (step 1030). Thus, for example, known credit risk biometric data and known credit risk identifying application data can be downloaded to all subscribing service providers. Conversely, industry-specific profile data (e.g. relating to telephone call patterns) is received from and preferably only re-distributed to subscribing corresponding industry service providers (e.g. among telephone service providers). Other industries are preferably similarly accommodated with industry-specific profile data.

While the preferred embodiment and details of the invention have been described above, it will be apparent to those skilled in the art that various changes and modification may be made without departing from the scope of the invention, as is defined by the claims below.

What is claimed is:

1. A fraud detection system, comprising:
    a biometric device for receiving biometric data of an applicant;
    a workstation for inputting application data for the applicant; and
    a local verification program that compares the received biometric data and inputted application data to locally stored biometric data and application data and, if either of the received biometric data and inputted application data match locally stored data of a locally known credit risk, identifies the applicant as a credit risk, and if the received biometric data matches locally stored data of a locally known person but the inputted application data does not match locally stored data for the locally known person, creates an alternate identity of the known person and identifies the applicant as the alternate identity.

2. A fraud detection system according to claim 1, further comprising:
    a communication program that forwards the received biometric data and inputted application data to a remotely located verification center and, if either of the received biometric data and inputted application data match centrally stored data of a centrally known credit risk, receives an identification of the applicant as the credit risk, and if the received biometric data matches centrally stored data of a centrally known person but the inputted application data does not match centrally stored data for the known person, receives an identification of the applicant as the alternate identity.

3. A fraud detection system according to claim 2, wherein the communication program further receives a shared ID when the applicant has been identified as the alternate identity.

4. A fraud detection system according to claim 2, further comprising:
    an agent interface that alerts an agent associated with the workstation when the applicant has been identified as one of the credit risk and the alternate identity.

5. A fraud detection system according to claim 2, wherein the communication program is further operative to download newly discovered known risk data and to update the locally stored data therewith.

6. A fraud detection system according to claim 1, further comprising:
    an agent interface that alerts an agent associated with the workstation when the applicant has been identified as one of the credit risk and the alternate identity.

7. A fraud detection system according to claim 1, wherein the applicant is applying for a subscription for services that requires repeated transactions and payment over time, and wherein the local verification program is associated with a provider of the services.

8. A fraud detection system according to claim 7, wherein the local verification program is further operative during one of the transactions to compare further received biometric data associated with the one transaction with locally stored biometric data, and if the further received biometric data does not match the locally stored biometric data, to create the alternate identity of the locally known person.

9. A fraud detection system according to claim 1, wherein the applicant is applying for a subscription for services that requires repeated transactions and payment over time, and wherein the local verification program is associated with a provider of the services, and wherein the communication program further receives usage data by subscribers of the provider of other services not provided by the provider.

10. A fraud detection system, comprising:
means for receiving biometric data of an applicant;
means for inputting application data for the applicant; and
means for comparing the received biometric data and inputted application data to locally stored biometric data and application data and, if either of the received biometric data and inputted application data match locally stored data of a locally known credit risk, for identifying the applicant as a credit risk, and if the received biometric data matches locally stored data of a locally known person but the inputted application data does not match locally stored data for the locally known person, for creating an alternate identity of the known person and identifying the applicant as the alternate identity.

11. A fraud detection system according to claim 10, further comprising:
means for forwarding the received biometric data and inputted application data to a remotely located verification center and, if either of the received biometric data and inputted application data match centrally stored data of a centrally known credit risk, for receiving an identification of the applicant as the credit risk, and if the received biometric data matches centrally stored data of a centrally known person but the inputted application data does not match centrally stored data for the known person, for receiving an identification of the applicant as the alternate identity.

12. A fraud detection system according to claim 11, wherein the forwarding means further includes means for receiving a shared ID when the applicant has been identified as the alternate identity.

13. A fraud detection system according to claim 11, further comprising:
means for alerting an agent associated with the workstation when the applicant has been identified as one of the credit risk and the alternate identity.

14. A fraud detection system according to claim 11, wherein the forwarding means is further operative for downloading newly discovered known risk data and for updating the locally stored data therewith.

15. A fraud detection system according to claim 10, further comprising:
means for alerting an agent associated with the workstation when the applicant has been identified as one of the credit risk and the alternate identity.

16. A fraud detection system according to claim 10, wherein the applicant is applying for a subscription for services that requires repeated transactions and payment over time, and wherein the comparing means is associated with a provider of the services.

17. A fraud detection system according to claim 16, wherein the comparing means is further operative during one of the transactions for comparing further received biometric data associated with the one transaction with locally stored biometric data, and if the further received biometric data does not match the locally stored biometric data, for creating the alternate identity of the locally known person.

18. A fraud detection system according to claim 10, wherein the applicant is applying for a subscription for services that requires repeated transactions and payment over time, and wherein the comparing means is associated with a provider of the services, and wherein the forwarding means further receives usage data by subscribers of the provider of other services not provided by the provider.

19. A fraud detection method, comprising:
receiving biometric data of an applicant;
inputting application data for the applicant; and
comparing the received biometric data and inputted application data to locally stored biometric data and application data;
identifying the applicant as a credit risk if either of the received biometric data and inputted application data match locally stored data of a locally known credit risk; and
creating an alternate identity of the known person and identifying the applicant as the alternate identity if the received biometric data matches locally stored data of a locally known person but the inputted application data does not match locally stored data for the locally known person.

20. A fraud detection method according to claim 19, further comprising:
forwarding the received biometric data and inputted application data to a remotely located verification center;
receiving an identification of the applicant as the credit risk if either of the received biometric data and inputted application data match centrally stored data of a centrally known credit risk; and
receiving an identification of the applicant as the alternate identity if the received biometric data matches centrally stored data of a centrally known person but the inputted application data does not match centrally stored data for the known person.

21. A fraud detection method according to claim 20, further including receiving a shared ID when the applicant has been identified as the alternate identity.

22. A fraud detection method according to claim 20, further comprising:
alerting an agent associated with the workstation when the applicant has been identified as one of the credit risk and the alternate identity.

23. A fraud detection method according to claim 19, further comprising:
alerting an agent associated with the workstation when the applicant has been identified as one of the credit risk and the alternate identity.

24. A fraud detection method according to claim 19, wherein the applicant is applying for a subscription for services that requires repeated transactions and payment over time, and wherein the comparing step is associated with a provider of the services.

25. A fraud detection method according to claim 24, further comprising:

comparing further received biometric data during one of the transactions associated with the one transaction with locally stored biometric data; and creating the alternate identity of the locally known person if the further received biometric data does not match the locally stored biometric data.

26. A fraud detection method according to claim 19, wherein the applicant is applying for a subscription for services that requires repeated transactions and payment over time, and wherein the comparing step is associated with a provider of the services, the method further comprising:

receiving usage data by subscribers of the provider of other services not provided by the provider.

27. A fraud detection method according to claim 19, further comprising:

downloading newly discovered known risk data; and updating the locally stored data therewith.

* * * * *